Feb. 6, 1951  V. S. RUTHERFORD ET AL  2,540,963
RESISTANCE THERMOMETER ELEMENT
Filed April 6, 1949  2 Sheets-Sheet 1

INVENTORS
VICTOR S. RUTHERFORD
AND ANTHONY J. HORNFECK
BY
Raymond D. Jenkins
ATTORNEY Feb. 6, 1951 V. S. RUTHERFORD ET AL 2,540,963
RESISTANCE THERMOMETER ELEMENT
Filed April 6, 1949 2 Sheets-Sheet 2

INVENTORS
VICTOR S RUTHERFORD
AND ANTHONY J. HORNFECK
BY
Raymond D. Junkins
ATTORNEY Patented Feb. 6, 1951

2,540,963

UNITED STATES PATENT OFFICE 2,540,963

RESISTANCE THERMOMETER ELEMENT

Victor S. Rutherford, East Cleveland, and Anthony J. Hornfeck, Lyndhurst, Ohio, assignors to Bailey Meter Company, a corporation of Delaware Application April 6, 1949, Serial No. 85,914

6 Claims. (Cl. 201—63)

This invention relates to measuring apparatus and particularly to apparatus used in the measurement of temperature.

The use of a Wheatstone bridge for the measurement of temperature is well known. One leg of the bridge, comprising a wire having a characteristic of electrical resistance varying with temperature, is subjected to the temperature to be measured. The bridge, or other balanceable electric network, is unbalanced upon change in resistance of the temperature sensitive element as caused by a variation in the temperature to be measured. Usually such unbalance initiates a mechanical and/or electrical action to rebalance the network. The magnitude of such rebalancing action is indicated or recorded as a measure of the change in temperature. Thus a continuous record may be produced of the temperature. Such a system is commonly known as a resistance thermometer.

One particular problem in the measurement of temperature is in connection with flowing fluids which are usually contained in conduits and may be under a high pressure. The resistance element should be located within the flowing stream to obtain as true a temperature of the fluid with as little effect from the conduit or outside air as possible. Usually the element is encased in a well or socket for mechanical protection and with the possibility of ready removal.

The difference of temperature which may exist between the wall of the retaining well or socket and that of the sensitive resistance element, tends to result in substantial error in the indication of a temperature of the medium. Prior constructions, specifically intended to minimize this tendency, have themselves frequently tended markedly to increase the time lag of the device, or delay its response to the changes in the temperature of the medium. It is an object of our invention to minimize simultaneously the error and the time lag both above mentioned.

A particular object of our present invention is in connection with improved temperature sensitive assemblies for resistance thermometers.

It is another object to provide an improved construction of resistor element which is capable of withstanding heavy shock and vibration over long periods of service.

It is another object to provide improved means for supporting the resistance element assembly within the restraining well or socket of the device.

It is another object to provide improved means for increasing the overall speed of response of resistance thermometers to changes in temperature.

Figure 1:
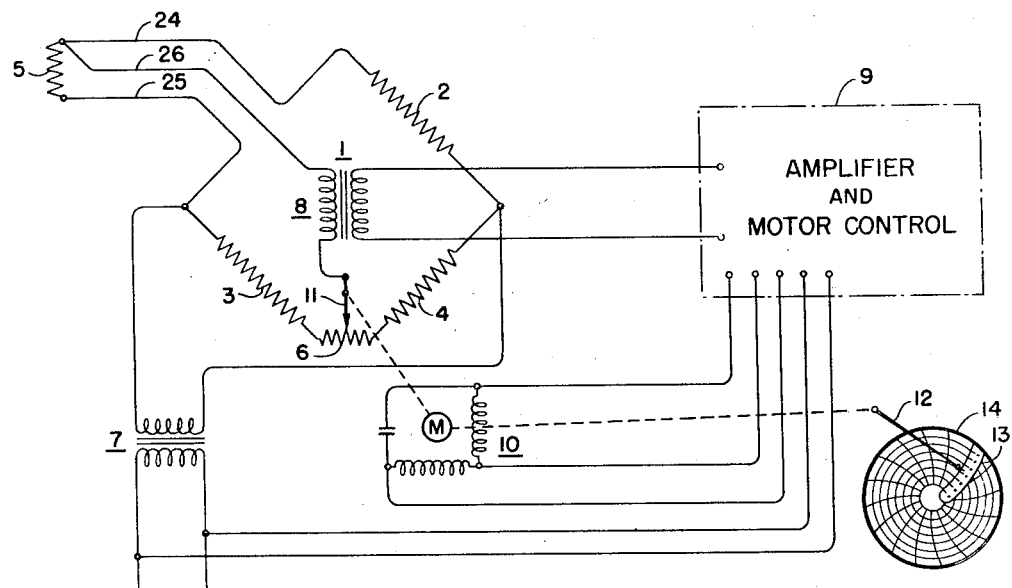
Fig. 1 is an elementary diagram of a balanceable network including a temperature sensitive resistance element.

In Fig. 1, we illustrate a very elementary balanceable bridge circuit such as a Wheatstone bridge 1 having fixed resistance arms 2, 3 and 4; a variable resistance element 5 sensitive to the temperature to be measured; and an adjustable balancing resistance 6. The bridge is supplied with alternating current from a supply transformer 7. An output transformer 8 leads to an amplifier and motor control circuit 9 for directional and speed control of a motor 10. The motor 10 is preferably a capacitor-run motor arranged to position the contact 11 along the adjustable resistance 6 and at the same time to position an indicating-recording pen 12 relative to a scale 13 and to a revoluble chart 14.

Upon a change in the temperature to be measured, the resistance of the element 5 increases or decreases, thus unbalancing the bridge 1 and resulting in a positioning of the motor 10 in one direction or the other. Such positioning moves the contact 11 along the balancing resistance 6 until the bridge is rebalanced. At the same time the pen 12 is moved to indicate and record the new temperature.

It is customary to provide a metallic protecting well or socket for the resistance element 5, either with or without the possibility of removing the element for repair or replacement. Many applications for temperature measurement are in connection with fluids flowing under pressure through conduits. To obtain a true measure of the temperature of the flowing fluid it is advisable to have the resistance element 5 located within the flowing stream, and this dictates that entry must be made through the wall of the enclosing conduit without the possibility of leakage of the fluid outwardly to the atmosphere. Under certain conditions it is feasible to provide a socket or well in the wall of such a conduit of a type which may be removed. In other instances, the well or socket must be welded or fastened in place so that no possibility of fluid leakage may occur. Under such a condition it is advisable to have the possibility of removing the resistance element 5 from the socket or well for repair or replacement, and to be able to do this without disturbing in any way the flow of fluid within the conduit.

It is obviously desirable to have the resistance element respond as fast as possible to temperature changes of the medium. The response rate is determined by the transverse thermal conductance between the medium and the socket and between socket and the element, and by the thermal capacity of both the socket and the element.

Figure 2:
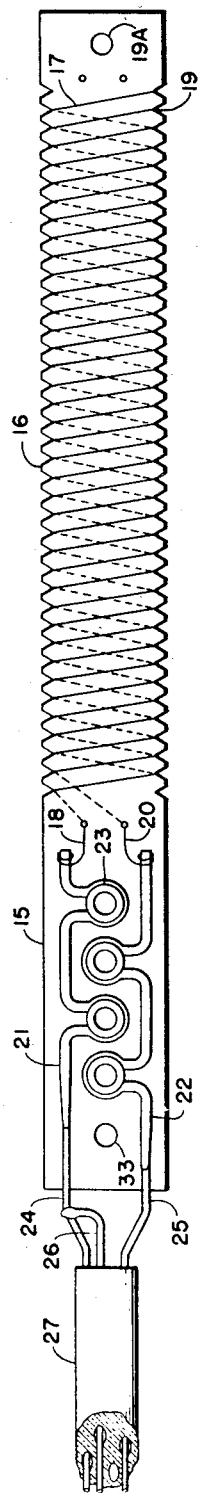
Fig. 2 is a mechanical drawing of a preferred form of our temperature sensitive element in partially completed showing.

In Fig. 2 we show to approximately twice actual scale a partially assembled element such as is indicated at 5 in Fig. 1. A strip of mica 15 is provided with teeth 16 on its opposite edges which are formed by turning a double screw thread. Around the teeth 16 is wound a fine wire 17 beginning as at 18 and winding in alternate teeth 16 to the right-hand end of the assembly where the wire is turned as at 19 and wound in the empty teeth to the point 20. This provides a non-inductive winding, being an advantage featured particularly in A.-C. bridge circuits. Preferably we use about 10 feet of .004" diameter platinum wire which produces a resistance of 32.0 ohms at 32° F. We are able to standardize on such a resistance element and take care of calibration corrections in the other legs of the bridge. Furthermore we may use our measuring apparatus for a wide variety of temperature ranges by adjusting the value of the resistances 2, 3 or 4. While we have found it desirable to standardize on a construction approximating the above specification we are not limited thereby. For example, if we desire to average three different temperatures, or the temperature at three different locations in a duct, we may make three elements 5 each bearing approximately 10.6 ohms resistance and connect the three elements in series to form the bridge leg 5.

Platinum was chosen for the resistance element for these temperatures (usually below 1500° F.) in spite of the fact that base metals, such as copper and nickel, are frequently used. The platinum resistance thermometer is the accepted standard for the range −190° C. to 660° C. It has a high resistivity and temperature coefficient of resistance as well as a high resistance to corrosion and does not oxidize. Platinum can be obtained having a high degree of purity and constancy of physical characteristics. This insures ease of calibration and duplication of elements and a permanence of calibration unequaled by other metals. The platinum element, furthermore, is extremely stable. For temperatures up to 1500° F. platinum is in little danger of contamination and the rate of vaporization is negligible.

At the head of the assembly we provide two flattened bar members 21 and 22, preferably of nickel, which are fastened to the mica strip by rivets 23. As will be clearly seen from Fig. 2 the construction permits the joining of wires 18, 20 to nickel lead members 24, 25 respectively without any strain being placed upon the platinum wires 18 and 20 in subsequent handling or installation. The platinum wire is gold soldered to the nickel members 21 and 22 near the location 18, 20. Preferably the nickel lead wires 24, 25 and 26 are spaced and protected in a ceramic tube 27 leading to a terminal head not shown.

Figure 3:
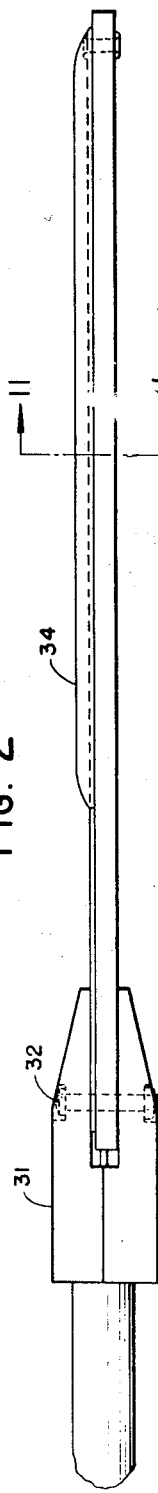
Fig. 3 is a side view of one embodiment of the element in final manufactured form for use in a flat form of well or socket.
Figure 4:
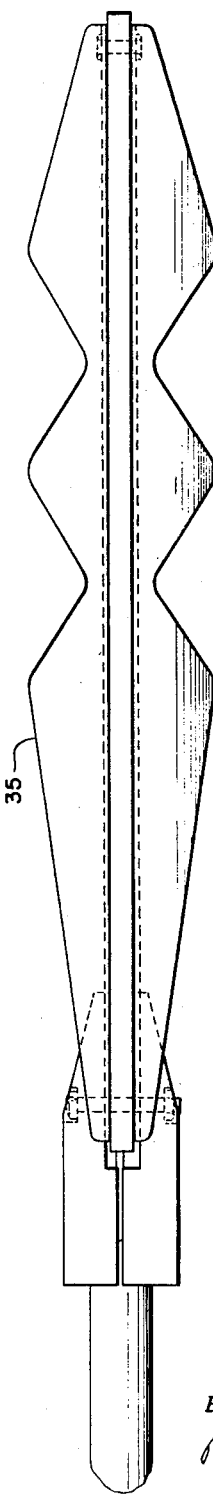
Fig. 4 is a side view of a second embodiment of the element in final manufactured form for use in a circular form of well or socket.
Figure 5:
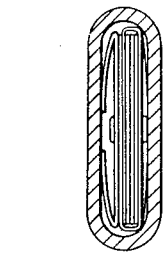
Figs. 5 and 6 are end views respectively of flat and circular wells or sockets with temperature elements in place.
Figure 6:
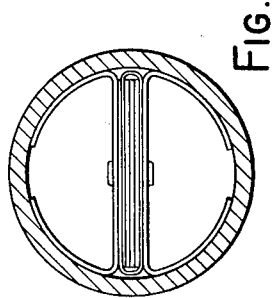

In Figs. 3 and 4 we illustrate the element of Fig. 2 in two completed forms. Figs. 5 and 6 are end views of the elements of Figs. 3 and 4 as they appear in place within flat and round forms of protecting sockets or wells. Figs. 2, 3, 4, 5 and 6 all are shown to approximately twice actual scale.

Figure 7:
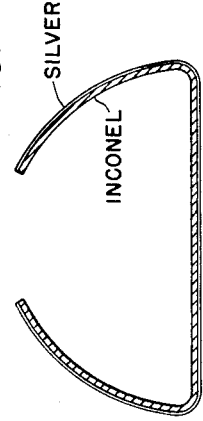
Fig. 7 is a cross sectional end view of one of the spring elements, or frames, for use in a circular well or socket.

In Fig. 7 a cross section of one half a frame section is shown as used with a circular form of well or socket to illustrate its general shape, while unattached, and the lamination of its structure. The lamination arrangement of the preferred embodiment insures that the portion thereof which conducts heat the more readily contacts the wall of the well or socket and thereby maintains a path of efficient heat conductance therefrom to the resistance wire 17.

Progressing in manufacture beyond the assembly of Fig. 2, we next (see Fig. 11) place a shielding strip of mica 28 on one side of the wire wound assembly and a strip 29 on the other side. The winding of the wire 17 in the teeth 16 on the mica card 15 recesses the wire from the edge a distance sufficient to insure against any possibility of metallic contact therewith after protecting mica cards 28, 29 are placed on the flat of the windings with such width to extend them slightly beyond the wire at the edges of card 15. The whole of the assembly of mica cards is then enclosed in a relatively thin envelope 30 of material having a high rate of heat conductivity and a low specific heat.

The enclosing envelope serves multiple purposes. With the envelope 30 in place along the entire length of that portion of card 15 carrying windings of wire 17, the conductive properties thereof aid in maintaining an even distribution of the heat conducted thereto with a resulting increase in the speed of response to any change in the degree of the heat. Additionally, the envelope adds to the strength of the assembly by reason being clamped thereto by bolts through holes 33 and 19A as well as transverse compression reducing its susceptibility to shock and vibration. At the same time, envelope 30 serves to protect the edges of the strips from mechanical damage upon insertion or withdrawal from the protecting well or socket. And the entire unit, as illustrated in Figs. 3 and 4, may be readily handled or shipped without danger of fraying the edges of the mica strips or possibility of damage to the wire 17.

With the construction hereinafter illustrated and described we obtain a maximum rate of thermal conductance between the medium, the socket and the element. The element assembly is given substantially uniform positive contact with the interior of the protecting well or socket with the construction shown. An envelope about the mica strips 28, 29 and 15, between which is retained resistor wire 17, aids in distributing the heat conducted from the well or socket wall uniformly along the element. The sheet of material 30, forming the enclosing envelope the length of strips 29 and 28, assumes the cross sectional profile indicated at Fig. 11. It is the construction and arrangement of the envelope, as well as the spring means used to suspend the assembly within the well or socket, that forms a particular feature of our invention.

Figure 11:
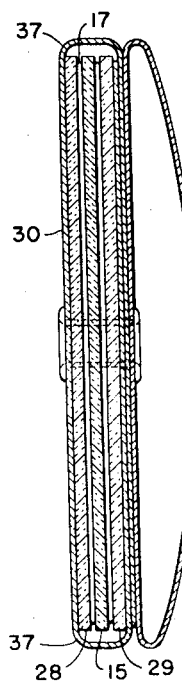
Fig. 11 is a section of Fig. 3, along the lines 11—11 in the direction of the arrows, showing an enclosing envelope in place about the element assembly.
Figure 10:
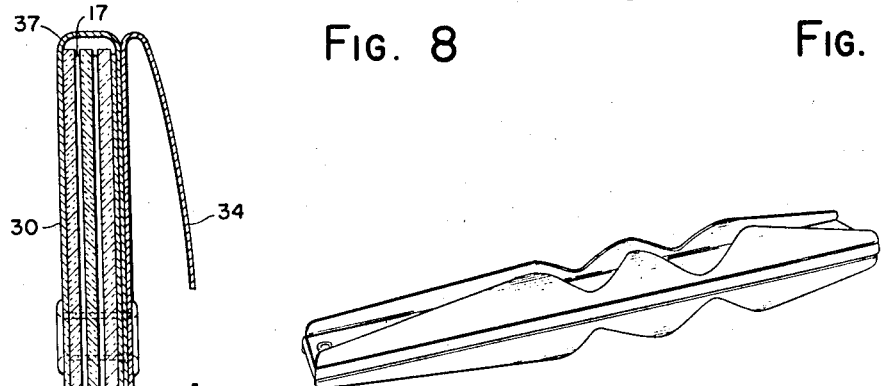
Fig. 10 is a perspective of the embodiment of our invention for use in a circular form of well or socket.

In Fig. 11 the enclosing envelope about the assembly of mica strips is shown in place so as to be in substantially uniform area contact with frame section 34 as it functions to retain the mica strip assembly in compression throughout substantially its entire length. Fig. 11, for clarity of understanding, is shown to approximately eight times actual scale.

At the end of the assembly we provide ceramic, or lava, pieces 31 which are clamped to the enveloped mica strip assembly by a screw 32 passing through a hole 33 in the mica strips. Such clamping prevents longitudinal shifting of pieces 31 and ties together the tube 27 and the enveloped assembly including the mica strips.

Inasmuch as we preferably enclose the element assembly of Figs. 3 and 4 in metallic sockets, we provide the frameworks 34 and 35 whose outwardly flaring fins become depressed, or flexed somewhat when the assembly is slid into a protecting well or socket as will be explained. These frames may be formed from strips of flat metal stock simply by bending up the side portions from such strips. Each member thus comprises a flat base portion and side fins. The flat base portion lies adjacent and opposite the flat side of the windings of wire 17 but are in positive contact with the envelope enclosing the wire windings within the assembly of the three mica strips. The side fins curve inwardly so as to conform to the interior surface of the well or socket. In their natural, unrestrained, positions, however, the fins spread out beyond the contour of the walls of the well or socket.

Such action by the fins performs a plurality of functions. For example, the assembly as a whole is held without clearance or vibration within its well or socket. The flexing or compression of the fins produces a force upon the envelope 30 which thereby in turn grips the mica strip assembly firmly. Simultaneously, the reactionary force acting radially outward, aids a positive contact between the fins and the walls of the enclosing well or socket.

Figures 8, 9:
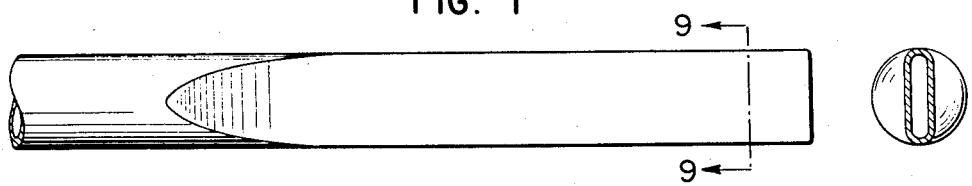
Figs. 8 and 9 are side and end views respectively of a flat well or socket for containing a resistance element assembly.

As heretofore described the basic element assembly is adaptable for use in both flattened and circular forms of wells or sockets. For use in flattened forms a single frame 34 is secured to one side of the envelope containing the assembly of mica strips as illustrated in Figs. 3 and 11. In Fig. 5 we show the assembly in place within the flattened well or socket of Figs. 8 and 9. As illustrated in Fig. 11, the fins of the single frame are flared back toward the base thereof to the extent necessary for insertion within the flattened form of well or socket. As illustrated by Fig. 3 the flaring fins need extend only substantially the length of the mica strip assembly from their free end to where they are clamped by pieces 31 to properly perform their function. Such arrangement gives a metal to metal contact with the interior of the well or socket, between the lines 37 (Fig. 11), through the spring of the fins of 34. Such area contact with the well or socket wall serves to substitute for the frame element function of heat conductance similar to that performed by the single frame on the other side of the envelope, reducing lag in heat transmission from the well or socket wall to wire 17 contained in and between the mica strip assembly.

Although the use of the envelope 30 and frames of metal stock, having an advantageous function to be hereinafter described in detail, materially advances the efficiency of element assemblies used in flat wells or sockets, the efficiency and strength of elements used in circular wells or sockets is additionally enhanced by a peculiar shaping of the fin profile of frame 35. The profile of the fins of frame 35 are shaped through their central section in a scalloping series of peaks and hollows and taper the remaining length to each end. Due to the tendency of uniform profiles of such frames to buckle, wrinkle, or curl upon insertion and during service within a circular well or socket, we develop this profile to eliminate such characteristics and thereby promote a metal to metal contact with the well or socket wall of maximum efficiency while adding strength and rigidity to the suspension action, while ease of withdrawal and replacement is advanced. Thus in the element assembly of Fig. 4, we promote efficiency of heat transfer to wire 17 to such degree as to be comparable to that in the flat well or socket assembly of Fig. 3.

As heretofore indicated, the metal stock, from which we formed the frames of all embodiments of our invention, is of such unique construction itself as to form a part of our inventive concepts. Although silver is generally known to have an excellent heat conductive characteristic on the order of 1 calorie per degree centigrade per square centimeter per centimeter per second, it has likewise been observed that its modulus of elasticity is so easily exceeded above 600° F. that its spring action in frame bodies fails to give the positive metal to metal contact with the walls of a well or socket needed for efficient heat transfer to the wire 17. Therefore, for the majority of applications, frames of silver have been unsatisfactory in the past, both from the standpoint of loss of efficient heat conductance, as well as the loss of rigidity of suspension of the assembly within the well or socket which allows shock and vibration to have greater effect on the assembly.

Inconel, is a metal of nickel base with approximately 13% chromium, 6% iron and small amounts of manganese, silicon and copper which will retain the elastic properties desired above 600° F.

A utilization of these desirable characteristics of both materials may be had by laminating the two metals into a single piece of stock from which the frames for use in both types of wells or sockets may be fabricated. A high degree of conductivity, combined with a satisfactory degree of elasticity at high temperatures, is thereby obtained. As shown by Fig. 7, the more conductive silver is placed in the lamination so as to form that part of the fin of the frame in positive metal to metal contact with the wall of the well or socket so that it might conduct heat therefrom to the enevelope about the assembly of mica strips containing the wire 17. The less conductive inconel is thereby relegated to a position from which it, by spring action, constantly promotes the metal to metal contact between the silver portion and the wall of the well or socket.

For the enclosing envelope, silver has been found most satisfactory. Such envelope 30, is positioned as illustrated in Fig. 11, to perform its function as heretofore described.

We have illustrated and described a preferred embodiment of our invention. It will be apparent that other forms or variations of construction may be accomplished without departing from the spirit of our invention, and that therefore we do not expect to be limited to the specific embodiments described.

What we claim as new and desire to secure by Letters Patent of the United States, is:

1. A resistance thermometer element assembly comprising in combination, an elongated flat strip of insulating material, a resistance wire wound about said strip, a protecting strip of insulating material secured to the flat sides of said wound strip, a metallic envelope enclosing said strips to form a minimum of heat storage in and about thereof, a metallic framework with a base portion substantially coextensive with the enclosed strips and providing at least one longitudinally extending outwardly turned portion whose central section profile is formed by a plurality of depressions terminating to the end of said framework length with a taper from the central section, and means for clamping the framework base, metallic envelope, and the insulating strips in fixed relation to one another.

2. The resistance thermometer element assembly of claim 1 wherein the longitudinally extending outwardly turned portion of the framework has a cross-section forming an arc of a circle.

3. A framework for a resistance thermometer element comprising, a first metal having a high heat conductivity characteristic, a second metal whose modulus of elasticity is relatively unaffected by relatively high degrees of heat in laminating relation thereto, said framework having at least one outwardly turned portion thereof which when depressed relative to the remainder of the framework operates to exert a force on the base thereof normal thereto and tending to move it away from said depressed portion and whose profile is formed by its middle section being broken by a plurality of depressions and the remaining portion thereof tapered to the ends thereof so as to diminish from the edge of the last depression, and whose cross section offers the said outwardly turned portion in an arc form extending from a flat base section.

4. A metal body for forming a framework for a resistance thermometer element comprising, a first side of silver, a second side of inconel laminated with said first side in such intimate contact therewith that the resulting body retains a high heat conductivity characteristic and a modulus of elasticity inconsequentially affected by relatively high degrees of heat.

5. As an article of manufacture, a resistance thermometer element comprising in combination, an elongated strip of heat resisting electrical insulating material, a resistance wire formed about said strip, shielding strips of similar material sandwiching the wire bearing strip for insulatingly protecting the wire, a metallic sheath for said strips and a metallic framework for the sheath for insertion in a protecting well, said framework having a portion substantially coextensive with the said strips and a longitudinally extending fin formed with at least one generally triangular shaped projection conforming in positive contact with the inner wall of a protecting well.

6. The article of claim 5 wherein the framework is of a lamination of two metals, one of the metals of high heat conductivity and the other having a modulus of elasticity relatively unaffected by high temperatures.

VICTOR S. RUTHERFORD.
ANTHONY J. HORNFECK.

REFERENCES CITED

The following references are of record in the file of this patent:

UNITED STATES PATENTS

| Number | Name | Date |
| --- | --- | --- |
| 2,153,152 | Mucher | Apr. 4, 1939 |
| 2,450,263 | Wise | Sept. 28, 1948 |

FOREIGN PATENTS

| Number | Country | Date |
| --- | --- | --- |
| 607,970 | Germany | Nov. 3, 1932 |